Aug. 2, 1938.  R. L. BROWNLEE  2,125,539
BACK GAUGE FOR SQUARING SHEARS
Filed Sept. 23, 1935  2 Sheets-Sheet 1
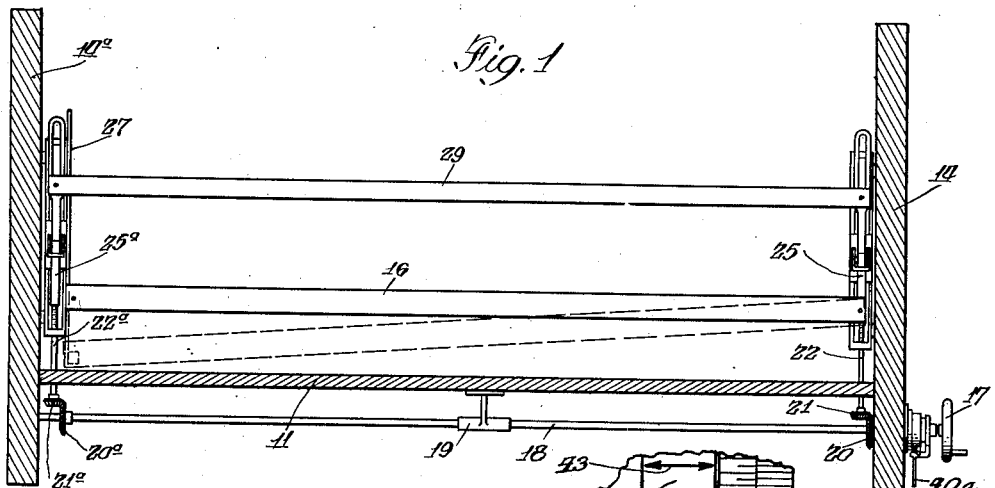
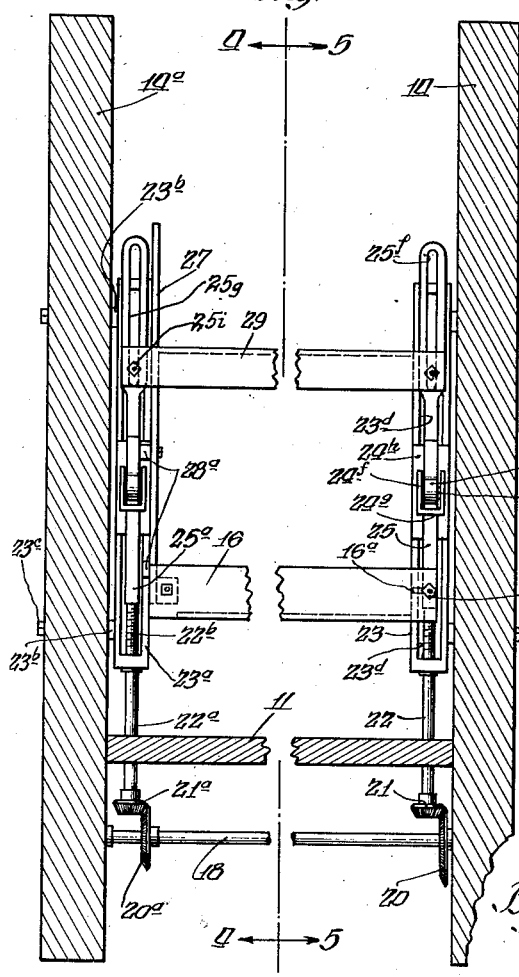
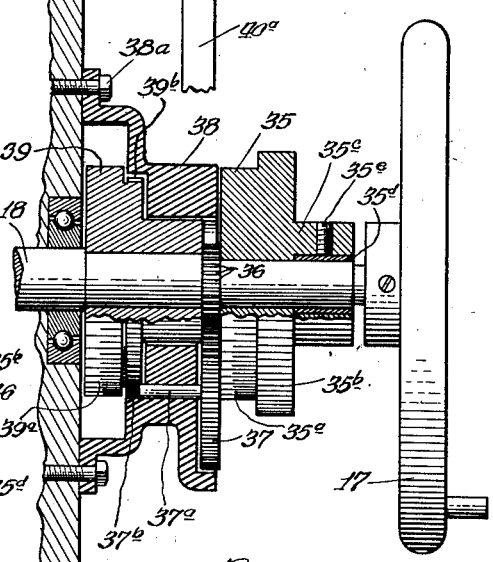
Inventor:
Robert L. Brownlee.
By: Stevens & Batcheler
Attys.

Aug. 2, 1938. R. L. BROWNLEE 2,125,539
BACK GAUGE FOR SQUARING SHEARS
Filed Sept. 23, 1935 2 Sheets-Sheet 2
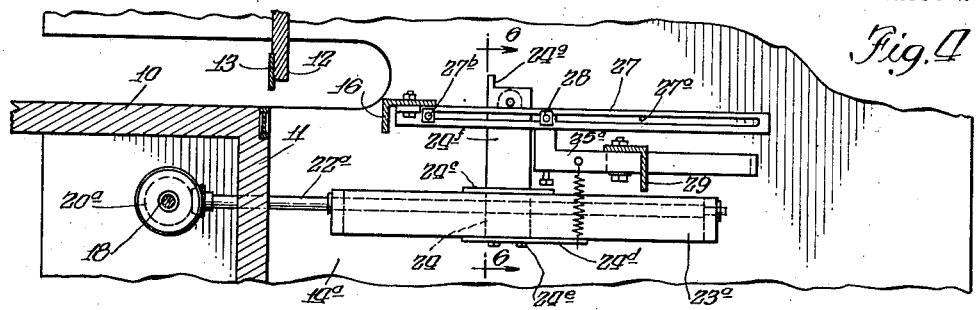
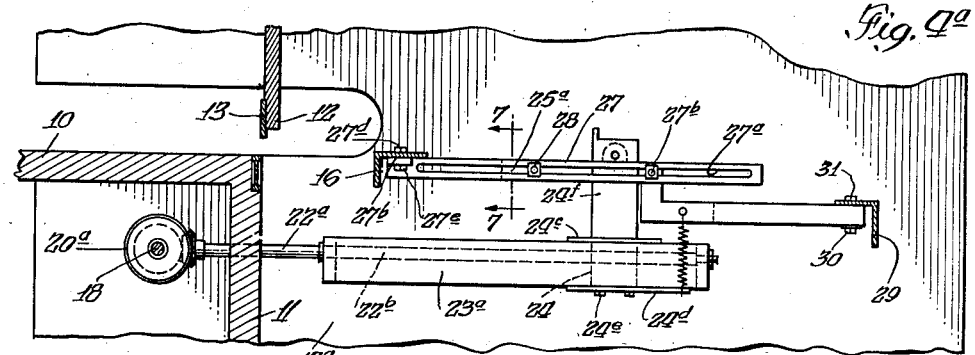
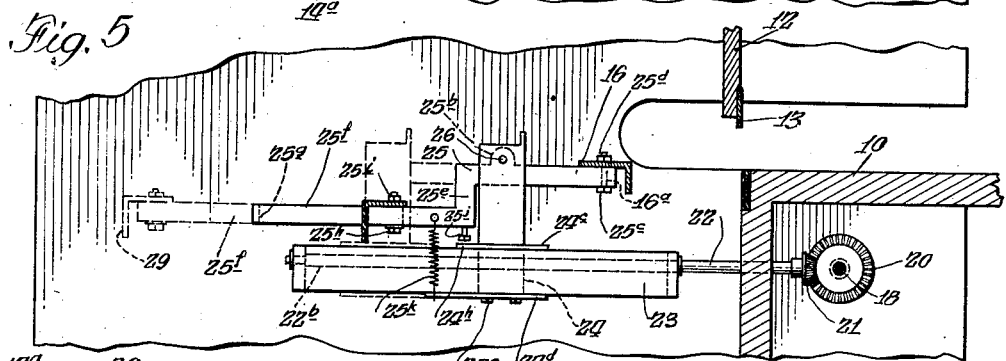
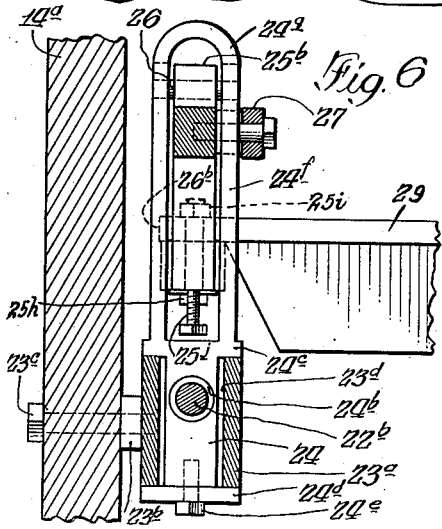
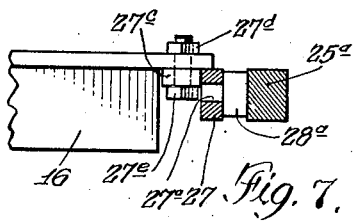
Inventor:
Robert L. Brownlee.
By: Stewart Batchelor
Atty's.

Patented Aug. 2, 1938

2,125,539

UNITED STATES PATENT OFFICE 2,125,539

BACK GAUGE FOR SQUARING SHEARS

Robert L. Brownlee, Chicago, Ill., assignor to Dreis & Krump Mfg. Company, Chicago, Ill.

Application September 23, 1935, Serial No. 41,804

6 Claims. (Cl. 164—59)

My invention relates to squaring shears, and more particularly to back gauges therefor, and my main object is to improve the conventional back gauge with a novel control which is operable from the front of the shear.

A further object of the invention is to provide a balanced mechanism on both ends of the gauge, whereby to move the same uniformly and without strain.

A still further object of the invention is to design the novel gauge with a yieldable support, in order to make allowance for the pressure transmitted to the gauge by the shearing action.

Another object of the invention is to so construct the novel gauge that it may afford unlimited clearance for the work sheet in a forward direction.

An additional object of the invention is to provide an adjustment control for the gauge which enables the same to be set to fine limits.

A significant object of the invention is to design the novel gauge with an angle adjusting mechanism for use when the work sheet is to be cut on a bias.

An important object of the invention is to construct the same of few and simple parts and as a unit readily applicable to squaring shears of the standard types.

With the above objects in view, and any others which may suggest themselves from the description to follow, a better understanding of the invention may be had by reference to the accompanying drawings, in which—

Fig. 1 is a plan section of a portion of a squaring shear, showing the novel back gauge;

Fig. 2 is an enlargement of the end portions of Figure 1, partly broken away;

Fig. 3 is an enlarged elevation partly in section of a preferred hand control for the gauge;

Fig. 3a is an enlarged fragmental reproduction of a part shown in the right-hand lower portion of Figure 1;

Fig. 4 is a section on the line 4—4 of Figure 2, and indicates the gauge set for a square cut;

Fig. 4a is a view similar to Figure 4, showing the gauge set for a bias or oblique cut, as indicated by dotted lines in Figure 1;

Fig. 5 is a section on the line 5—5 of Figure 2;

Fig. 6 is an enlarged section on the line 6—6 of Figure 4; and

Fig. 7 is a section on the line 7—7 of Figure 4a.

In the application of a back gauge to the conventional squaring shear, it has long been the practice to adjust the depth of the gauge by going around to the rear of the machine and operating a suitable mechanism to move the gauge accordingly. The check on the movement is secured by inserting a measuring stick or rule from the front each time an adjustment is made or from a scale fastened to the gauge. It will be realized that this method of controlling and checking the gauge is very unhandy; also, it taxes the patience of the operator and takes time which might otherwise be employed to better advantage. Further, where attempts have been made to locate the control for the back gauge in a forward or handier position, it has been necessary to extend the connections from the rear of the machine in a roundabout way to reach the frontal control site, making the construction complicated, cumbersome and inaccurate. In addition to the above considerations, various difficulties and deficiencies have been contended with in back gauges of existing types, and it has therefore been my intention not only to provide a handy and direct control therefor, but also to simplify and ease the action of the gauge whereby to greatly improve its efficiency.

In the application of the novel back gauge, specific reference to the drawings indicates the bed of a conventional squaring shear at 10, the front at 11, the ram at 12, the blade at 13, and the end walls at 14 and 14a.

The conventional back gauge for the machine is in the form of an angle bar 16 extending crosswise between the walls 14 and 14a and at a height substantially even with the bed 10. In order that the movement of the gauge may be uniform from front to rear, and vice versa, I control the gauge bar 16 at its ends, providing companion gearings therefor. Thus, the latter originate with a hand wheel 17 located outside the machine at the front and instrumental in rotating a horizontal shaft 18 journaled endwise in the walls 14 and 14a and medially in a frontal bearing 19, as indicated in Figure 1. On the inner sides of the walls 14 and 14a, the shaft 18 receives identical bevel gears 20 and 20a which are in mesh with frontal terminal bevel gears 21 and 21a carried by shafts 22 and 22a extending from front to rear along the inner sides of the walls and making connection with the ends of the back gauge 16 through parts presently to be described. It will be evident that, with the shafts 22 and 22a geared as shown and described, they will receive motion in the same direction and at the same rate from the operation of the hand wheel 17, such motion being transmitted to the ends of the back gauge and resulting in the uniform rearward or forward movement thereof.

In order to procure the back gauge feed as contemplated above, my construction requires that a pair of supporting blocks 23 and 23a be applied to the inner sides of the walls 14 and 14a. As indicated in Figure 2, these blocks are made with bosses 23b abutting the respective walls and adapted to receive bolts 23c from the outside of these to securely fasten the blocks in horizontal position. The blocks are formed with vertical longitudinal openings 23d, and the shafts 22 and 22a are journaled in the ends of the blocks, so that the greater portions of the shafts occur in the openings of the latter, such portions being threaded to serve as feed screws 22b.

Each block receives in its opening a carriage 24, the same being tightly fitted with a bushing 24b which is internally threaded to serve as a traveling nut upon the related screw 22b. In order that the block may serve as a guide for the travel of the carriage 24, the latter is made with an enlargement 24c on each side over the top edges of the block walls; also, a bottom plate 24d underlies the bottom edges of the latter, such plate being secured to the carriage by bolts 24e.

Above each block, the carriage 24 rises in the form of laterally spaced walls 24f, which are joined at the front end by an integral top arch 24g, this element serving to maintain the spacing of the carriage walls. With reference to the right-hand side of the machine as viewed from the front, Figure 5 shows a hanger 25 passing through the upper portion of the corresponding carriage 24, the hanger being pivotally mounted by means of an apertured ear 25b upon a pin 26 passing crosswise through the hanger and the carriage walls. The front end of the hanger forms a support for the top of the back gauge 16, the connection with the same being made by passing a bolt 25c upward through the hanger and a longitudinal slot 16a in the said top, the bolt receiving a securing nut 25d. The hanger has a drop 25e where it emerges from the carriage 24, continuing with a rearward portion 25f. The suspension of the hanger 25 as just described permits it to have a pivotal or rocking motion in respect to the carriage, and this motion can be adjustably limited by a set screw 25j applied to the bottom of the hanger portion 25e and adapted to stop on an extension 24h of the carriage. Also, a spring 25k is connected between the hanger portion 25f and the bottom plate 24d to draw the rear portion of the hanger downwardly.

In relation to the wall 14a of the machine, the parts just described are duplicated, except that the corresponding or left-hand end of the back gauge 16 is not supported directly on the hanger 25a, but on an arm 27, which is horizontally slotted at 27a along its greater course. The forward portion of the hanger 25a has a pair of laterally projecting bolts 27b which pass at spaced points through the slot 27a, receiving securing nuts 28 on the inner side of the arm and spacers 28a on the outside thereof. The latter has a side lug 27c at the front, such lug being adapted to receive the extended top of the corresponding end of the back gauge 16 which is vertically perforated for the passage of a bolt 27e and the application of a securing nut 27d to the same. Thus, by loosening the nuts 27d, 28 and 25d, it is possible to slide the arm 27 forth and back to locate the corresponding end of the back gauge accordingly, the slot 16a in the right-hand end of the gauge making allowance for the arcuate variation of the left-hand end thereof.

It will now be seen that with the normal position of the back gauge 16 as indicated by full lines in Figures 1, 4 and 5, the operation of the hand wheel 17 in one or the other direction will move the two carriages 24 forward or rearward and so carry the gauge to the desired position, the gauge position referred to being for a square cut. However, in case the cut is to be on a bias, the hand wheel 17 is rotated in a direction to carry the gauge 16 back a considerable distance, this position being represented by the carriage 24 in Figure 4a. However, where the actual position of the gauge relative to the carriage would in such event be as shown in Figure 4, the loosening of the nuts 27d, 28 and 25d, and the forward adjustment of the arm 27 to the extent required for the particular bias, the nuts then being retightened, will place the assembly as indicated in Figure 4a and represented at the other side of the machine by the dotted lines in Figure 5. The operation just described has left the gauge in the original back position at the right-hand side of the machine, but swung it to the forward position of Figure 4a at the left hand side of the machine, so as to appear at the angle indicated by dotted lines in Figure 1. It will now be evident that, with the nuts retightened, the gauge is again rigid but in the angular position, and that it may be moved forward or back in parallelism by the manipulation of the hand wheel 17, to the desired depth. Also, it is understood that the above bias adjustment is made only in one direction, since it is only necessary to turn the work sheet over if a bias cut in the opposite direction is wanted.

It is seen from Figures 4 and 5 that the back gauge 16 is positioned with its top somewhat above the level of the bed 10, so as to present its front directly in the path of the work sheet. When the latter has been set and the ram 12 caused to descend for the cut, the stress imposed upon the rear portion of the sheet causes the same to bear against the gauge and jam or buckle to a greater or less extent. This is a hardship which the conventional back gauge, which is rigidly mounted, presents. In my case, however, it is seen that the gauge is pivotally suspended and that its pivot is slightly above the line of the work sheet. Hence, it is clear that the stress imposed by the shear ram, while immediately transmitted to the gauge, is relieved by the yielding of the gauge in a downward direction and in a rearwardly departing arc. Thus, while the gauge is always properly positioned to serve its purpose when the work sheet is inserted, it readily yields and makes room when the rear part of the sheet receives downward stress, so that no strain or hardship is imposed on the gauge or the sheet, and the attendant friction, wear of the gauge and noise are eliminated.

Where the gauge 16 has been swung forward at one end, such as for a bias cut, a tendency may exist to overbalance the hangers in a forward direction. To counteract such a tendency, I have provided a compensating angle bar 29 at the rear, extending the top of the same endwise to overlie the rear portions 25f of the hangers. The extensions of the bar are perforated to receive slide bolts 25h passed upwardly through vertical slots 25g made in the rear portions 25f of the hangers, securing nuts 25i being provided for the bolts. It is seen that in case of the overbalance referred to, the angle bar 29 can be adjusted accordingly to correct the condition.

While any type of indicator may be employed in connection with the hand wheel 17 as a guide for setting the back gauge the desired distance, I prefer to employ the geared indicator shown in Figure 1 and more clearly in Figures 3 and 3a. The assembly shows the hand wheel 17 to be directly mounted on the shaft 18, the latter also receiving a drum dial 35 marked with peripheral graduations 35a in 64ths from zero to one inch, and having an enlargement 35b cut with notches numbered as the graduations. The dial has a hub 35c which is secured to the shaft 18 by means of a split bushing 35d and a set screw 35e. The shaft 18 also carries a spur pinion 36 which meshes with a gear 37 whose spindle 37a is journaled in a bracket 38 bolted at 38a to the wall 14. The bracket 38 is of arched form whereby to permit the drum dial 39 to be freely mounted on the shaft 18 in the space within the bracket. The dial 39 is peripherally calibrated at 39a— preferably in inches—and carries a gear 39b which is in mesh with a pinion 37b carried by the gear spindle 37a. As indicated more clearly in Figure 3a, the toothed part 35b of the drum dial 35 receives a detent 40 pivoted at 41 to the bracket 38 and urged into engagement with the said toothed portion by a spring 42. The detent has a projecting arm 40a which may be swung to the left when it is desired to release the dial 35 for rotation. Thus, when this is done, the hand wheel 17 may be turned rapidly in order to move the gauge to approximately the point at which it is to be set, at which time the arm 40a of the detent is released, so that the further manipulation of the hand wheel is step by step by the tripping of the detent in the notches of the dial portion 35b. While this is done, it is noted that the considerable gear reduction to the dial 39 causes the same to turn very slowly. With this dial calibrated in inches from zero to 18 inches the gear reduction is such that each turn of the dial 35 moves the dial 39 over one inch. In relation to an origin mark 43 the general movement of the control is read on the dial 39, while the final or close one is read on the dial 35. It is preferable that the gauge be so geared that one turn of the hand wheel 17 will cause a depth movement of one inch on the part of the gauge. To secure this, the ratio of the gears 20 and 21 is 1 to 2, giving the shaft 22 twice the speed of the shaft 18. However, the screw portion of the shaft 22 secures a reversal or reduction of the same ratio, so that the travel of the gauge is equal in inches to the revolutions of the hand wheel 17.

It will be apparent from the above description that I have developed a back gauge mechanism which is built along simple mechanical lines and in the form of a unit which may be applicable with facility to squaring shears of conventional design. Further, the novel gauge mechanism replaces an unhandy and difficult method of adjusting, reading and setting the back gauge, and places the control within the immediate reach of the operator. Further, the novel gauge departs from the standard fixed type to yield and relieve hardships and wear imposed by the action of the shear on the work sheet, without loss of accuracy or adjustment. Moreover, the location of the gauge mechanism with its major units immediately alongside the walls of the machine provides an unlimited amount of room between such units for the feed of the work sheet under or over the gauge bar in a rear direction as far as desired without encountering any obstacle, making it easier to handle a long sheet through the machine than on the floor. While the gauge is properly balanced, the stop screws 25j thereof prevent the gauge bar from rising above the zone of the work sheet, so that the gauge bar is always in a position to assume its departing travel in a downward direction as soon as the cutting operation occurs. Finally, the gauge mechanism is of a rugged and durable design, and of a nature to be inexpensively manufactured.

I claim:

1. In a squaring shear, a back gauge, a frontal shaft forming a control therefor, companion screws geared to and extending rearwardly of the shaft, traveling supports threaded on the screws, and hangers suspended from horizontal pivots in the supports, the hangers extending horizontally forward and the gauge being attached to the frontal portions of the hangers.

2. The structure of claim 1, the hangers being positioned relative to the end portions of the gauge, an adjustable forward extension for one of the hangers to swing the gauge to an angular position suitable for a bias cut on the work, and a counterbalancing element applied to the rear portions of the hangers to compensate for overbalancing tendencies in the frontal zone of the extended hanger.

3. The structure of claim 1, the hangers being positioned relative to the end portions of the gauge, an adjustable forward extension for one of the hangers to swing the gauge to an angular position suitable for a bias cut on the work, and a counterbalancing element applied to the rear portions of the hangers to compensate for overbalancing tendencies in the frontal zone of the extended hanger, said counterbalancing element being a bar attached with its ends adjustable forth and back along said rear hanger portions.

4. In a squaring shear having stationary means and a shear head movable relative thereto; a support carried by said stationary means and adjustable to positions between the front and rear, means for effecting the adjustment of the support, a back gauge carried by the latter at the height of the work, said gauge being fixed against rearward movement in a horizontal plane relative to the support when the latter has been adjusted to a desired position, and said gauge being yieldable in a downward and rearward direction upon pressure thereon of the work during the shearing operation.

5. The structure of claim 4, and means adjustably limiting said downward and rearward movement of said gauge.

6. The structure of claim 4, and said movement of said gauge being through a rearwardly departing arc.

ROBERT L. BROWNLEE.